Patented June 12, 1928.

1,673,111

UNITED STATES PATENT OFFICE.

CHARLES L. GABRIEL AND CHARLES BOGIN, OF TERRE HAUTE, INDIANA, ASSIGNORS TO COMMERCIAL SOLVENTS CORPORATION, OF TERRE HAUTE, INDIANA, A CORPORATION OF MARYLAND.

NITROLCELLULOSE-LACQUER COMPOSITION.

No Drawing. Application filed May 21, 1925. Serial No. 31,969.

Our invention pertains to the production of nitrocellulose lacquer compositions and relates more specifically to the employment of butyl lactate in such compositions, whereby the volatility of the lacquer is reduced and the relative smoothness of the film is improved. As is well known, a simple solution of nitrocellulose in a solvent mixture does not constitute a satisfactory lacquer for brush or spray application, as a film thus produced is too taut and wrinkled to serve as a satisfactory surface. To increase the body of the lacquer—i. e.—the solid material actually forming the permanent film—without increasing the viscosity of the solution beyond a point where brush or spray application is possible—it is customary to incorporate varying proportions of varnish gums in the lacquer. Suitable gums for this purpose include natural resins such as kauri, elemi, shellac and dammar, and also include certain synthetic resins. The addition of these gums improves the adherence of the film and reduces the penetrability of the film to water. In proper admixture, these gums also improve the durability of nitrocellulose lacquers.

The admixture of gums with nitrocellulose solutions is a difficult matter, for the reason that these materials are best dissolved in alcohols or hydrocarbons, whereas nitrocellulose is most soluble in organic ester solvents. Frequently in compounding gum solutions and nitrocellulose solutions, problems of incompatibility of solutions arise and either the nitrocellulose or the gum is precipitated.

In the case of pigmented lacquers, the nitrocellulose-gum-solvent mixture is incorporated with suitable pigments, ordinarily by grinding the pigment and solution in a ball mill.

Solvents employed in compounding nitrocellulose lacquers include various organic liquids, some of which dissolve nitrocellulose, some of which dissolve gums, and some of which dissolve both nitrocellulose and gums. Lacquer solvents are ordinarily divided into four classes, in accordance with their boiling point or volatility as follows.

| | Nitrocellulose solvents | Gum solvents and diluents |
|---|---|---|
| Low boilers | Ethyl acetate | Ethyl alcohol. Benzol. |
| High boilers | Butyl acetate. Amyl acetate. | Butanol. Toluol. |
| Super-high boilers | Diethyl carbonate. Diacetone alcohol | Xylol. |
| Plasticizers | Butyl phthalate | |
| Boiling point above 300° C. | Tricresyl phosphate | |

In compounding a nitrocellulose lacquer, some of the nitrocellulose solvents listed above are obviously necessary. If gums are to be incorporated in the mixture a gum solvent is necessary. In cases in which synthetic resins soluble in nitrocellulose solvents are employed, it is of cource not necessary to employ special gum solvents, but even in such cases the materials ordinarily employed as gum solvents—i. e.—hydrocarbons and alcohols—are ordinarily employed as diluents to reduce the viscosity and to adjust the volatility of the lacquer.

On account of the fact that gum solvents ordinarily do not dissolve nitrocellulose, and vice versa, great care must be taken in compounding a lacquer to adjust the relative proportions of these materials so that an even rate of evaporation is attained during the drying of the film. If this not done, and an excess of nitrocellulose solvent remains on the surface when the last traces of gum solvent are evaporating, the gum is coagulated or precipitated and a "fogged" or "blushed" film results. The reverse is also true—i. e.— if gum solvents (hydrocarbons or alcohols) remain in the film as the last traces of nitrocellulose solvents evaporate, the nitrocellulose is coagulated or "gelled" and a "blushed" film is produced.

Fogged or blushed films are also produced even in the case of a proper balance of nitrocellulose solvents and gum solvents, if the net evaporation of the solvent mixture is too rapid. In this latter case, the cooling effect of the evaporating solvents causes the precipitation in the film of water from the air, and a fogged, useless film results.

In view of the above facts, a nitrocellulose lacquer designed for brush or spray application is ordinarily compounded in such a manner that a careful balance is maintained between gum and ester solvents, for reasons previously described, and the volatility of the solvent mixture is adjusted to a point where the evaporating solvents do not exert sufficient cooling effect to cause a precipitation of moisture from the air. At the same time, the reduction in volatility allows the film to dry uniformly without wrinkle-formation or undue tautness and a much smoother surface is thereby attained.

For example a typical clear nitrocellulose lacquer is prepared by dissolving 16 ounces of nitrocellulose and 16 ounces of gums in one gallon of a solvent mixture comprising 25% amyl acetate, (high boiler); 25% ethyl acetate, (low boiler); 25% benzol, (low boiler); and 25% toluol (high boiler).

One of the objects of our present invention is to produce a slowly evaporating lacquer suitable for application by means of a paint brush or spray, and we attain this object with a minimum of expensive high boiling solvents. We have discovered that normal butyl lactate is a peculiarly suitable super-high-boiling solvent for employment in nitrocellulose lacquer compositions. A relatively small proportion of butyl lactate will replace a much larger proportion of a high boiling solvent and is more effective in producing smooth uniform films than are other high boiling solvents known in the art.

Normal butyl lactate is a water-white organic ester boiling at about 187–189° C. without decomposition. Unlike its lower homologues, it is insoluble in water and hence non-hygroscopic.

For example, ten per cent of butyl lactate will replace twenty-five per cent of high boiling nitro-cellulose solvents such as amyl acetate, and the resultant lacquer composition will dry slowly to form exceptionally smooth and even non-blushing films of good adherence. The following formula is illustrative of this new development:—

16 ounces nitrocellulose (lacquer cotton).
16 ounces gum (50% each of dammar gum and ester gum) dissolved in one gallon of solvent mixture comprising:—
10% butyl lactate.
30% ethyl acetate.
25% benzol.
20% toluol.
15% xylol.

If a plastic lacquer—i. e.—a film that will tolerate considerable expansion, and contraction and bending is desired, about eight ounces of a plasticizer such as dibutyl phthalate may be added.

In some cases, for example, when an extremely uniform rate of drying is desired the above formula may be modified by replacing some of the low-boiling ethyl acetate with a high boiler such as butyl acetate.

We are aware that A. Nobel, in English Patent 15,914 of 1894, claimed the use of butyl lactate as a nitrocellulose solvent and we do not broadly claim such use. Our invention pertains to the use of butyl lactate in combination with certain other materials to form nitrocellulose lacquer compositions of retarded volatility and extreme smoothness in drying.

Now, having fully described our invention, we claim the following as new and novel:—

1. A lacquer composition comprising nitrocellulose and varnish gums dissolved in a solvent mixture comprising normal butyl lactate, ethyl acetate, and a mixture of the lower members of the benzene series of hydrocarbons.

2. A lacquer composition comprising nitro-cellulose and varnish gums dissolved in a solvent mixture comprising normal butyl lactate, ethyl acetate, benzol, toluol, and xylol.

3. A lacquer composition comprising nitrocellulose, varnish gums, normal butyl lactate, ethyl acetate, a mixture of the lower members of the benzene series of hydrocarbons, a plasticizer, and a pigment.

4. A lacquer composition comprising one pound nitrocellulose and one pound of varnish gums dissolved in one gallon of a solvent mixture containing 10% normal butyl lactate, 30% ethyl acetate, 25% benzol, 20% toluol, and 15% xylol.

5. A lacquer composition comprising one pound nitrocellulose dissolved in one gallon of a solvent mixture comprising 10% normal butyl lactate, 30% ethyl acetate, 25% benzol, 20% toluol, and 15% xylol.

6. A lacquer composition comprising nitrocellulose, normal butyl lactate, and a mixture of low-boiling solvents.

7. A lacquer composition comprising nitrocellulose, varnish gums, normal butyl lactate, a lower member of the benzene series of hydrocarbons, and a mixture of low-boiling solvents.

In testimony whereof we affix our signatures.

CHARLES L. GABRIEL.
CHARLES BOGIN.